United States Patent
Powell

(10) Patent No.: US 6,779,405 B2
(45) Date of Patent: Aug. 24, 2004

(54) METHOD OF MEASURING VACUUM PRESSURE IN SEALED VIALS

(76) Inventor: David John Powell, 82 Belmont Street, Southport, Merseyside (GB), PR8 1JH ( * ) Notice: Subject to any disclaimer, the term of this patent is extended or adjusted under 35 U.S.C. 154(b) by 0 days.

(21) Appl. No.: 10/399,946
(22) PCT Filed: Oct. 23, 2001
(86) PCT No.: PCT/GB01/04702
§ 371 (c)(1), (2), (4) Date: Apr. 22, 2003
(87) PCT Pub. No.: WO02/35199
PCT Pub. Date: May 2, 2002

(65) Prior Publication Data
US 2004/0035213 A1 Feb. 26, 2004

(30) Foreign Application Priority Data
Oct. 24, 2000 (GB) .............................................. 0025956

(51) Int. Cl.[7] ................................................. G01L 7/10
(52) U.S. Cl. ...................... 73/729.2; 73/700; 73/23.27; 73/753; 73/19.05
(58) Field of Search ............................. 73/753, 19.05, 73/23.27, 700, 729.2

(56) References Cited

U.S. PATENT DOCUMENTS

| | | | |
|---|---|---|---|
| 4,288,306 A | * 9/1981 | Kieferle et al. | 204/192.38 |
| 4,306,155 A | * 12/1981 | Cotic | 250/385.1 |
| 4,321,126 A | * 3/1982 | Kieferle et al. | 204/298.41 |
| 4,546,319 A | 10/1985 | Pfaff et al. | 324/460 |
| 4,592,065 A | * 5/1986 | de Witte | 372/83 |
| 4,792,725 A | * 12/1988 | Levy et al. | 315/39 |
| 4,942,296 A | * 7/1990 | Jones | 250/288 |
| 5,013,975 A | * 5/1991 | Ukegawa et al. | 315/248 |
| 5,022,759 A | * 6/1991 | Ficalora | 356/459 |
| 5,036,195 A | * 7/1991 | Batey et al. | 250/288 |
| 5,237,175 A | * 8/1993 | Wells | 250/288 |
| 5,245,192 A | * 9/1993 | Houseman | 250/423 R |
| 5,283,498 A | * 2/1994 | von Arx et al. | 313/17 |
| 5,284,556 A | * 2/1994 | Rich | 204/164 |
| 5,294,794 A | * 3/1994 | Davies | 250/287 |
| 5,331,660 A | * 7/1994 | Hauck | 372/94 |
| 5,433,832 A | * 7/1995 | Rich et al. | 204/164 |
| 5,466,932 A | * 11/1995 | Young et al. | 250/289 |
| 5,493,177 A | * 2/1996 | Muller et al. | 313/578 |
| 5,508,880 A | * 4/1996 | Beyer | 361/230 |
| 5,550,703 A | * 8/1996 | Beyer et al. | 361/229 |
| 5,766,364 A | * 6/1998 | Ishida et al. | 118/725 |
| 5,796,110 A | * 8/1998 | An et al. | 250/385.1 |
| 5,965,884 A | * 10/1999 | Laiko et al. | 250/288 |
| 6,118,218 A | * 9/2000 | Yializis et al. | 315/111.21 |
| 6,152,988 A | * 11/2000 | Plaks et al. | 95/58 |

FOREIGN PATENT DOCUMENTS

| | | |
|---|---|---|
| DE | 41 26 275 | 2/1993 |
| WO | WO 98/53293 | 11/1998 |

* cited by examiner

Primary Examiner—Edward Lefkowitz
Assistant Examiner—Andre Allen
(74) Attorney, Agent, or Firm—Reed Smith LLP

(57) ABSTRACT

The present invention provides a fast and accurate method of measuring the vacuum pressure in a sealed glass vial or other electrically non-conductive vessel. In the method the vial or vessel to be tested is placed between a pair of electrodes. The gas contained within the vial or vessel is ionized by applying a high frequency, high voltage potential across the electrodes. The voltage is progressively decreased once ionization has occurred and the termination of ionization is detected by registering either the sudden drop in electrode current or the termination of light emission from the vial. The gas pressure within the vial or vessel is derived as a function of the electrode voltage at the point at which ionization terminates.

19 Claims, 1 Drawing Sheet

METHOD OF MEASURING VACUUM PRESSURE IN SEALED VIALS

DESCRIPTION

This invention relates to an improved method of measuring the vacuum pressure in a sealed glass, or other electrically non-conductive vessel.

Perishable products are frequently packaged in evacuated glass vessels.

In order to ensure the integrity of the product supplied to the customer, it is usually necessary identify and reject vessels that are no longer properly evacuated due to leakage.

A known method of confirming the existence of a suitable vacuum within the vessel, is to use a high voltage, high frequency source, eg. a Tesla coil, to create an alternating electric field that ionizes the residual gas molecules within the vessel, if it is sufficiently evacuated.

The ionization can be detected, by the light emission from the discharge within the vessel, by registering the increase in current delivered by the high voltage source, or by registering a drop in voltage of the said source.

U.S. Pat. No. 4,546.319, proposes a method of deducing a quantitative value for the vacuum pressure within the vessel by measuring the value of electrode current and comparing it with a reference vial of a known pressure.

In practice, the above method is prone to considerable inaccuracy due to the fact that only a portion of the electrode current measured by the device is accounted for by the electrical discharge within the vial. Additional current due to stray capacitance and earth leakage can considerably distort the results. A further difficulty involved with quantitative measurement by this method is that the electrode current is non-linear with respect to vial pressure.

Patent DE 41 26 275 A1 discloses a non-invasive method of measuring internal pressure in which the electrode voltage is increased progressively, and the voltage at which ionization initially occurs is utilised as the parameter indicative of vial pressure.

In practice, the indeterminate time delay between the application of a suitably high voltage and the start of ionization introduces measurement errors—unless the voltage ramp rate is sufficiently slow that the delay variation becomes small compared to the overall ramp time.

Although DE 41 26 275 A1 discloses means to minimize the ionization delay, the delay is not eliminated and still introduces progressively larger errors as the voltage ramp rate is increased, such as would be required in the case of a high speed automatic testing process.

The current invention aims to provide a fast and accurate method of measuring vacuum pressure in sealed vials.

According to the present invention, there is provided, a method of measuring the vacuum pressure within a sealed vial or vessel comprising the following steps:

a) Placing the vial between a pair of electrodes.
b) Ionizing the gas contained within the vial by applying a high frequency, high voltage potenial across the electrodes.
c) Progressively decreasing the voltage once ionization has occurred.
d) Detecting the termination of ionization.
e) Deriving the gas pressure within the vial as a function of the electrode voltage at the point at which ionization terminates.

Detecting the termination of ionization may be by registering either the sudden drop in electrode current, or the termination of light emission from the vial. The point at which there is a sudden drop in electrode current or the light emission terminates, coincides with the termination of ionization.

In the method, the voltage at which ionization ceases is then measured. The vial pressure is proportional to the electrode voltage at which ionization ceases—herein referred to as the 'drop-out voltage'

The method produces a more accurate and consistent result than measuring the current at a given voltage as in U.S. Pat. No. 4,546,319 since the method is not affected by variations in leakage current or stray capacitance.

Unlike the method described in DE 41 26 275 A1, the present invention is not subject to errors due to time delay or hysteresis at the start of ionization. The ionization ceases instantaneously and repeatably once the voltage falls below that required to maintain a discharge. This enables a fast voltage ramp rate and thus rapid testing without compromising accuracy.

In the embodiment of the invention herein described, the drop-out voltage is measured by detecting the sudden drop in electrode current as ionization ceases.

Alternatively, the end of ionization may be detected optically by the termination of light emission from the vial.

The invention will now be described by way of example only, with reference to the following drawings in which.

Figure 1:
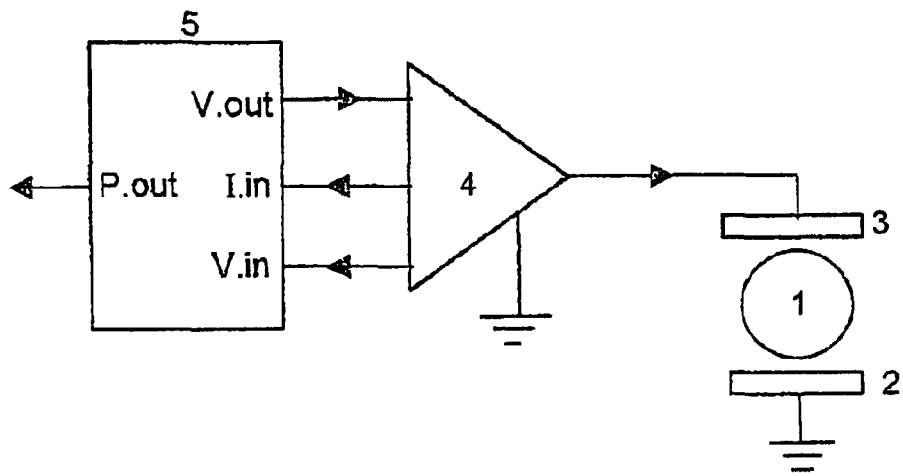
FIG. 1 shows a schematic diagram of apparatus employing the vacuum measurement method herein described.

Referring to FIG. 1, a vessel 1, under test is positioned between an electrode 2, at earth potential, and an electrode 3, driven by a high frequency, high voltage source 4, that can deliver, typically 20,000 volts at a few hundred Kilo cycles.

A controller 5 is provided with input signals indicative of the electrode voltage 'V.in' and electrode current 'I.in'. The controller 5 is further provided with means to control the output voltage of the source 4, by output signal 'V.out'.

Figure 2:
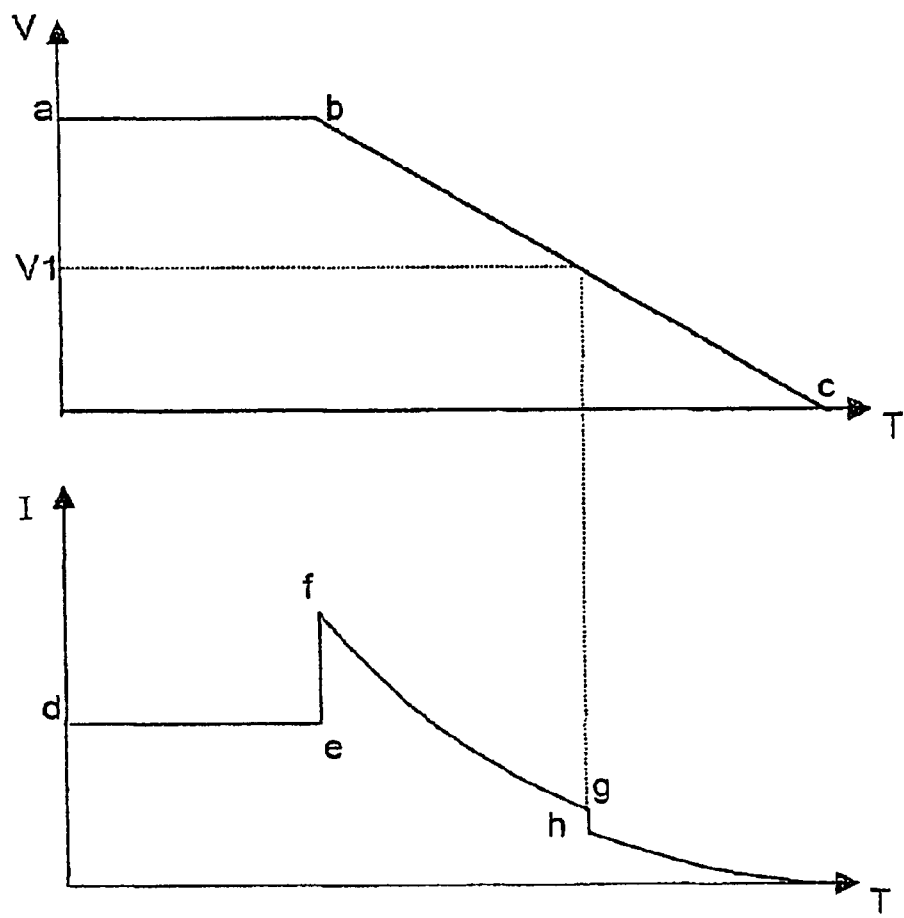
FIG. 2 shows typical graphs of electrode voltage 'V' and electrode current 'I' against time 'T'.

Referring to FIG. 2, which shows the electrode voltage 'V' and corresponding electrode current 'I' during a typical test sequence. The time period for the test sequence is typically of the order of a few hundred milliseconds. At the start of the pressure measurement sequence, the maximum voltage is applied, as shown at point 'a'. The corresponding electrode current for the un-ionized vial is indicated at point 'd'. After a short time delay, 'd-e', ionization of the vial commences, as indicated by the sudden increase in electrode current, 'e-f'.

If after a predetermined delay period with the maximum voltage applied, no ionization is detected, the controller may terminate the measurement sequence and provide a warning indicator, or other output signal to indicate that the vial is un-evacuated.

The ionization delay 'd-e' may be minimized by bombarding the vial with Beta particles from a radio isotope. A 10 microCurie Strontium 90 source will serve the purpose.

If the test is conducted on clear glass vials, the ionization delay may be minimized by a few seconds exposure to near—UV prior to the application of the electric field.

If the vial is sufficiently evacuated to allow ionization, the controller 5 detects the sudden increase in electrode current 'e-f' and commences to ramp down the output voltage of the source 4, as indicated by the slope 'b-c'.

As the electrode voltage is reduced, the electrode current falls progressively until point 'g' is reached, whereupon, there is an instantaneous drop in current 'g-h' as ionization of the gas within the vial ceases. The sudden change in electrode current is detected by means of a differentiator circuit or software algorithm within the controller 5.

The controller 5 measures the corresponding electrode voltage 'V1' at the instant that ionization ceases and compares this with results obtained from reference vials evacuated to known pressures. By means of interpolation, an accurate reading of internal pressure can be obtained. The controller 5 then provides an output signal indicative of vial pressure via output P.out.

As an alternative to direct measurement of the electrode voltage, the output of the source 4 may be ramped down at a given rate, and the time delay between the start of the ramp 'f' and the end of ionization 'g' may be utilised as the parameter indicative of vial pressure.

What is claimed is:

1. A method of measuring the vacuum pressure within a sealed vial or vessel comprising the following steps:
   a) placing the vial or vessel between a pair of electrodes,
   b) ionizing the gas contained within the vial or vessel by applying a high frequency, high voltage potential across the electrodes,
   c) progressively decreasing the voltage once ionization has occurred,
   d) detecting the termination of ionization,
   e) deriving the gas pressure within the vial or vessel as a function of the electrode voltage at the point at which ionization terminates.

2. A method as claimed in claim 1 in which the termination of ionization is detected by registering the sudden drop in electrode current.

3. A method as claimed in claim 1 in which the termination of ionization is detected by detecting the termination of light emission from the vial or vessel.

4. A method as claimed in claim 1 in which the maximum voltage is applied at the start of the test sequence to ionize the gas in the vial or vessel.

5. A method as claimed in claim 4 in which the electrode current is monitored while the maximum voltage is applied and an output signal is generated if no sudden increase in electrode current is noted after a predetermined delay period.

6. A method as claimed in claim 1 in which the ionization of the gas is speeded up by bombarding the vial with Beta particles from a radio isotope.

7. A method as claimed in claim 1 in which the ionization of the gas is speeded up by exposing the vial or vessel when made of clear glass to near—UV radiation prior to application of the electric field.

8. A method as claimed in claim 1 in which the voltage applied to the electrodes is ramped down after ionization is detected.

9. A method as claimed in claim 8 in which the sudden change in electrode current corresponding to the point where ionization ceases is detected by a differential circuit or software algorithm within a controller.

10. A method as claimed in claim 8 in which a controller measures the electrode voltage at the instant that ionization ceases and compares it with the results obtained from a reference table and provides as output signal indicative of the vial pressure.

11. A method as claimed in claim 1 in which the output voltage of a high frequency, high voltage source is controlled by a controller, and the controller monitors signals indicative of the electrode voltage and electrode current and has an output indicative of the vial pressure.

12. A method as claimed in claim 8 in which the electrode voltage is ramped down at a given rate and the time delay between ionization and the end of ionization utilised as a parameter indicative of vial pressure.

13. A method of measuring the vacuum pressure within a vial or vessel substantially as hereinbefore described with reference to the accompanying drawings.

14. A method as claimed in claim 2 in which the maximum voltage is applied at the start of the test sequence to ionize the gas in the vial or vessel.

15. A method as claimed in claim 3 in which the maximum voltage is applied at the start of the test sequence to ionize the gas in the vial or vessel.

16. A method as claimed in claim 2 in which the ionization of the gas is speeded up by exposing the vial or vessel when made of clear glass to near—UV radiation prior to application of the electric field.

17. A method as claimed in claim 3 in which the ionization of the gas is speeded up by exposing the vial or vessel when made of clear glass to near—UV radiation prior to application of the electric field.

18. A method as claimed in claim 4 in which the ionization of the gas is speeded up by exposing the vial or vessel when made of clear glass to near—UV radiation prior to application of the electric field.

19. A method as claimed in claim 5 in which the ionization of the gas is speeded up by exposing the vial or vessel when made of clear glass to near—UV radiation prior to application of the electric field.

* * * * *